United States Patent [19] [11] 4,111,905
Larkin et al. [45] Sep. 5, 1978

[54] FLAME RETARDING AGENTS AND POLYMER COMPOSITIONS CONTAINING SAME

[75] Inventors: William A. Larkin, Morristown; Irving Touval, Edison, both of N.J.

[73] Assignee: M&T Chemicals Inc., Stamford, Conn.

[21] Appl. No.: 763,350

[22] Filed: Jan. 28, 1977

[51] Int. Cl.$^2$ .............................................. C08K 3/10
[52] U.S. Cl. .............................. 260/45.75 B; 252/8.1; 260/45.7 R; 260/45.7 RT; 260/45.75 W; 260/45.7 P
[58] Field of Search ................... 260/45.75 W, 45.7 R, 260/45.7 P, 42.24, 45.7 RL, 40 P, 37 NP, 45.75 B; 428/921; 252/8.1

[56] References Cited

U.S. PATENT DOCUMENTS

| | | | |
|---|---|---|---|
| 2,711,968 | 6/1955 | Conery et al. | 260/42.24 |
| 2,772,158 | 11/1958 | Elliott | 260/45.75 W |
| 2,905,555 | 9/1959 | Fuchsman et al. | 260/45.75 W |
| 3,202,629 | 8/1965 | Ling | 260/45.75 W |
| 3,267,069 | 8/1966 | Cummings | 260/45.75 W |
| 3,331,811 | 7/1967 | Schafer | 260/45.75 W |
| 3,352,820 | 11/1967 | Bawn | 260/45.75 W |
| 3,462,389 | 8/1969 | Schulde et al. | 260/42.24 |
| 3,535,257 | 10/1970 | Kutner | 260/45.75 W |
| 3,900,441 | 8/1975 | King | 260/45.75 W |
| 3,945,974 | 3/1976 | Schwarcz et al. | 260/45.75 W |
| 3,962,154 | 6/1976 | Egli | 260/42.24 |

Primary Examiner—V. P. Hoke
Attorney, Agent, or Firm—Kenneth G. Wheeless; Robert Spector

[57] ABSTRACT

The flame retardancy imparted to synthetic organic polymers by a halogen source is significantly increased by the presence of zinc sulfide in the polymer composition. One or more specified basic compounds are optionally included to neutralize any acidic materials generated during pyrolysis of the polymer composition.

20 Claims, No Drawings

FLAME RETARDING AGENTS AND POLYMER COMPOSITIONS CONTAINING SAME

BACKGROUND OF THE INVENTION

This invention relates to decreasing the flammability of halogen-containing polymer compositions.

It is well known that the flammability of synthetic organic polymers can be significantly reduced by including a halogen source in the polymer composition. Among the preferred halogen sources are halogen-containing hydrocarbons, particularly bicyclic hydrocarbons such as perchloropentacyclodecane. Alternatively, the polymer itself can function as the halogen source. Examples of the latter are polyvinyl chloride and other polymers derived from halogen-containing monomers.

In addition to reducing flammability of synthetic polymers it is also desirable to reduce the amount of smoke generated during combustion, since in many instances the dense, toxic smoke presents as much, if not more, of a hazard than the fire itself.

A number of zinc compounds, including zinc oxide and zinc sulfate have been proposed as flame retardants for various types of polymers, however these compounds are less than desirable because they adversely affect the heat stability of the polymers.

It is therefore an objective of this invention to define those zinc compounds which act as flame retarding agents and smoke suppressants without adversely affecting the heat stability of halogen-containing polymers and polymer compositions containing an organic halogen source. Surprisingly it has been found that zinc sulfide, a relatively inexpensive zinc compound, achieves this objective.

SUMMARY OF THE INVENTION

This invention provides a flame retardant halogen-containing polymer wherein the halogen is chlorine or bromine, said composition comprising (1) a polymer selected from the group consisting of (a) polymers wherein from 50 to 100% of the repeating units are derived from a halogen-containing compound selected from the group consisting of ethylenically unsaturated compounds and saturated halogen-containing compounds which are, in turn, selected from the group consisting of dicarboxylic acids containing from 4 to 20 carbon atoms and diols containing from 2 to 20 carbon atoms, (b) non-halogen-containing polymers wherein the repeating units are derived from at least one ethylenically unsaturated compound and (c) non-halogen-containing condensation polymers selected from the group consisting of polyesters, polyamides, polycarbonates, epoxide polymers and non-cellular polyurethanes, wherein any non-halogen-containing polymer is present in combination with a quantity of an organic halogen-containing compound equivalent to from 7 to 40% chlorine or 3 to 20% bromine, based on the weight of the polymer, and (2) from 0.3 to 50%, based on the weight of said polymer, of zinc sulfide. A basic compound such as magnesium hydroxide or barium sulfate is optionally included in the composition to neutralize any acid by-products formed during pyrolysis of the polymer composition.

DETAILED DESCRIPTION OF THE INVENTION

Zinc sulfide is unique among zinc compounds in that it is water insoluble, does not adversely affect the heat stability of the polymer composition, and significantly improves the flame retardancy imparted to normally flammable polymeric materials by organic compounds containing chlorine or bromine.

Halogen-containing compounds suitable for use with zinc sulfide include, but are not limited to the following classes:

1. Chlorinated and brominated hydrocarbons such as methylene chloride, chloroform, the isomeric brominated and/or chlorinated ethanes, ethylenes, propanes, butanes and hexanes, halogenated cycloaliphatic hydrocarbons containing one or more rings which may be fused to form a bicyclic structure, halogenated aromatic hydrocarbons, including mono- and poly-halogenated benzene, toluene, xylene, naphthalene and anthracene. The compounds may contain one or more non-reactive substituents in addition to halogen, such as nitro or esterified acid or hydroxyl groups;

2. Chlorinated and brominated organic compounds containing one or more functional groups such as carboxylic acid anhydrides, amines, ketones and alcohols. Compounds containing two or more functional groups or a potentially reactive carbon-carbon double bond can be employed to prepare halogen-containing polymers which are useful as additives to render other polymers flame retardant in the presence of sodium antimonate. Alternatively the halogenated compounds can be incorporated by copolymerization into the polymer which is to be rendered flame retardant or non-burning;

3. Organic compounds containing halogen in addition to other elements, such as phosphorus, which impart flame retardancy to synthetic organic polymers. Preferred embodiments of this class of compounds are the brominated trialkyl- or triaryl esters of phosphoric acid, including tris(2,3-dibromopropyl)phosphate and tris(2,4,6-tribromophenyl) phosphate.

The amount of halogen-containing organic compound required to impart a given degree of flame retardancy to a particular polymer may vary somewhat depending upon the inherent flammability of the polymer, the halogen content of the organic compound and whether the halogen is chlorine or bromine. These ranges are sufficiently disclosed in the literature that a comprehensive discussion in this specification is not required. Normally between 7 and 40% of chlorine or 3 to 20% of bromine, based on the weight of the polymer, provides acceptable levels of flame retardancy.

As disclosed hereinbefore, the organic polymer can also function as the halogen source if the halogen content is sufficiently high. Suitable halogen containing polymers include polyvinyl chloride, polyvinylidene chloride, and copolymers of vinyl chloride and/or vinylidene chloride with ethylenically unsaturated monomers, including ethylene, propylene and styrene. Polyesters and other condensation polymers wherein one or more of the precursors contain chlorine or bromine, i.e., tetrabromophthalic anhydride, are also useful as halogen sources.

The combination of zinc sulfides and one of the halogen sources described in the preceding paragraphs imparts an effective level of flame retardancy to practically all classes of halogen- and non-halogen-containing synthetic organic polymers. If the polymer does not contain sufficient halogen, one of the chlorinated or brominated organic compounds described in a preceding section of this specification must be present in the final composition to obtain the desired degree of flame retardancy. The present flame retarding agents can be combined with addition and condensation type polymers. Examples of the former class include homopolymers and copolymers derived from organic compounds containing one or more double bonds between adjacent carbon atoms. Representative compounds of this class include mono- and diolefins such as ethylene, propylene, butylene, butadiene, neoprene, isoprene, and the various halogen-containing derivatives thereof, such as chloroprene and tetrafluoroethylene; vinylic compounds, such as styrene, vinyl chloride, vinylidene chloride, vinyl esters such as vinyl acetate; unsaturated acids and derivatives thereof, such as maleic acid, acrylic acid, methacrylic acid and esters derived from reaction of these acids with alcohols containing between 1 and 12 carbon atoms, inclusive; and unsaturated compounds containing various substituents, exemplified by acrylonitrile and 2-vinylpyridine.

Condensation polymers are prepared from monomers containing 2 or more functional groups such as carboxylic acid, hydroxyl, amine or isocyanate groups which can react intramolecularly to form an ester, amide, carbonate, urethane or other radical which characterizes the repeating unit of the polymer.

Addition polymers are prepared by bringing the monomer or monomers into contact with a source of free radicals, such as a peroxide, peroxy acid or compound containing an azo radical, i.e., azo-bisisobutyronitrile. The polymerization is relatively rapid and often exothermic.

Condensation polymerization reactions are usually considerably slower than addition type polymerizations. Elevated temperatures and the presence of acid or other type of catalyst are often required to achieve a useful reaction rate. Exceptions to this are the reaction of isocyanates with hydroxyl-containing compounds and the homopolymerization of epoxide radicals

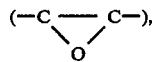

which can be considered addition type reactions since no by-products, such as water, are generated. This is also true for the reaction of phenols, melamines or ureas with formaldehyde. Examples of condensation type polymers include polyesters such as polyethylene terephthalate, polybutylene sebacate and unsaturated polyesters derived from phthalic anhydride, maleic anhydride and ethylene glycol or other difunctional alcohol; polyamides, including poly(hexamethylene adipamide), poly(hexamethylene terephthalamide) and polycaprolactam, the acetal resins and polysulfides.

Specific methods for preparing all of the foregoing classes of polymers are described in textbooks, journal articles and are usually available upon request from many manufacturers of the monomers. A complete discussion of polymer preparation in the present specification is therefore not required, since the procedures are known to those familiar with the art relating to synthetic organic polymers.

As stated in the preceding specification, it may be desirable to employ zinc sulfide in combination with a basic compound for the purpose of neutralizing any acidic materials generated as by-products during heating or combustion of the polymer composition. Preferred basic compounds include, but are not limited to, magnesium hydroxide, barium sulfate, calcium carbonate and hydrated alumina. Alkali metal and alkaline earth metal hydroxides are also effective in some instances, however the use of these compounds should be limited to polymer compositions which are not adversely affected by the presence of these highly alkaline compounds.

In addition to polymer, halogen source and zinc sulfide the present compositions may also contain a plasticizer in an amount from 5 to 100%, based on the weight of the polymer. Many halogen-containing polymers, particularly polyvinyl chloride, are inherently rigid, brittle materials. By combining the polymer with a suitable plasticizer it is possible to obtain a plastisol which is solid, semi-solid or liquid at ambient temperatures. Alternatively, an organic solvent can be added to the plasticized polymer to form an organosol. The resultant plastisol or organosol can readily be converted to shaped articles by casting or molding. Plasticized halogen-containing polymers are employed as coating or encapsulating materials for a wide variety of metallic and non-metallic substrates. Coatings for fabrics is only one of the many uses for these materials. The plasticized polymers are applied to the fabric in liquid form by dipping, spread coating or spraying. Plasticized polymers in a finely divided solid form known as powder coatings can be applied by suspending the polymer particles in an air stream and dipping a heated substrate into the suspended particles. Some of the particles contact and are melted by the heated surface to form a coherent coating. Other known techniques for applying powder coatings, including electrostatic spraying, can also be employed. Regardless of the application method, the coated substrate is usually heated to melt the polymer particles and form a coherent film.

Among the classes of known plasticizers for halogen-containing polymers are esters derived from aromatic or aliphatic dicarboxylic acids and monohydric alcohols, both of which contain between 6 and 20 carbon atoms. Representative plasticizers include dioctyl phthalate, dioctyl adipate and dioctyl sebacate. Other plasticizers include alkyl, aryl and mixed alkyl-aryl triesters of phosphoric acid such as triphenyl phosphate; esters of benzoic acid with oligomers of alkylene diols, such as dipropylene glycol dibenzoate, epoxidized esters of unsaturated acids such as butyl epoxy stearate, lower alkyl esters of trimellitic acid, chlorinated paraffinic hydrocarbons containing between 30 and 70% by weight of chlorine and liquid polyesters derived from aliphatic dicarboxylic acids and diols.

Zinc sulfide is effective when employed in combination with a halogen source as the sole flame retarding agent for synthetic organic polymers. Alternatively, this combination can be used together with other known flame retardants. Antimony trioxide is particularly suitable, since a small percentage of zinc sulfide has been shown to significantly increase the level of flame retardancy imparted by a given weight of antimony trioxide, even though zinc sulfide is a considerably less efficacious flame retarding agent than antimony trioxide. Mixtures containing these two compounds are therefore highly advantageous for use with synthetic organic polymers, as will be demonstrated in the accompanying examples. The antimony trioxide is present at a concentration of from 1 to about 10%, based on the weight of the polymer.

In addition to the present flame retarding compositions and, optionally, a plasticizer, polymer compositions often incorporate one or more stabilizers which decrease the susceptibility of the polymer to thermal degradation. Numerous classes of compounds can be employed for this purpose. Stabilizers preferred for use in vinyl chloride polymers include diorganotin compounds and liquid mixtures containing barium and cadmium compounds. One unique feature of zinc sulfide relative to other water-insoluble zinc compounds is that it does not counteract the effect of the heat stabilizer.

Other additives which may be incorporated into the present polymer compositions include volatile organic solvents such as ketones, primary alcohols, and liquid hydrocarbons containing between 1 and 12 carbon atoms, pigments such as titanium dioxide, antioxidants, which include hindered phenols, among others, lubricating agents, including paraffin waxes, fillers such as calcium carbonate or kaolin and viscosity control agents such as fused silica or polymeric glycols containing an average of between 2 and 5 repeating units per molecule. The antioxidant prevents or delays degradation of the polymer or other constituent of the composition by oxidizing agents, such as the oxygen present in the air. Polyethylene glycols and polypropylene glycols are among the most useful viscosity control agents.

The following examples demonstrate preferred embodiments of the present flame retarding compositions, and should not be interpreted as limiting the scope of the invention as defined in the accompanying claims. In the examples all parts and percentages are by weight unless otherwise indicated.

EXAMPLE 1

The effect of various flame retarding compositions on flammability was evaluated using a plasticized vinyl chloride polymer composition containing the following ingredients:

| | |
|---|---|
| Vinyl chloride homopolymer | 100 parts |
| Dioctyl phthalate | 50 parts |
| Epoxidized soybean oil | 3 parts |
| Barium-cadmium stabilizer* | 2.5 parts |
| Stearic acid | 0.5 part |
| Flame retardant | as specified |

*A mixture of barium and cadmium soaps containing 5% barium and 2.5% cadmium.

The flame retarding compositions tested contained zinc sulfide alone and in combination with antimony trioxide. The basic compounds present included magnesium hydroxide, barium sulfate (in combination with zinc sulfide as lithopone), calcium hydroxide and hydrated alumina.

The polymer formulations were blended using a heated 2-roll mill and formed into sheets measuring 0.020 inch (0.054 cm.) in thickness. Rectangular samples measuring 6 × 18 inches (15 × 47 cm.) along the edges were cut from the sheets and evaluated using the American Society for Testing and Materials (ASTM) Test E-162-67 (reapproved in 1973), the pertinent portions of which are hereby incorporated by reference. The flame spread index ($I_s$) of a sample is calculated using the formula $$I_s = F_s Q$$

wherein $F_s$, the flame spread factor, is determined using the equation $$F_s = 1 + (1/t_3) + [1/(t_6-t_3)] + [1/t_9-t_6] + [1/(t_{12}-t_9)] + [1/(t_{15}-t_{12})]$$

$t_3$, $t_6$, $t_9$, $t_{12}$ and $t_{15}$ correspond to the times in minutes from initial specimen exposure until the arrival of the flame front at the positions 3, 6, 9, 12 and 16 in. (76 ... 381 mm.), respectively, from the point of origin.

The term "Q", a direct measure of the heat evolved during burning of the sample, is defined by the equation $$Q = 0.1(T/\beta)$$

where:
  0.1 = an arbitrary constant,
  T = the difference between the observed maximum stack thermocouple temperature rise in degrees Fahrenheit with the specimen present and the temperature rise observed in the absence of the specimen, and
  $\beta$ = the maximum stack thermocouple temperature rise for unit heat input rate of the calibration burner in degrees Fahrenheit (per Btu per min.). This is a constant for the apparatus.

The data obtained from an evaluation of the aforementioned film samples using the ASTM E162-67 test are summarized in the accompanying Table I. These data demonstrate that the addition of zinc sulfide significantly reduces the flame spread and heat evolved during burning of a polymer containing a halogen source. Zinc sulfide also works effectively in combination with antimony trioxide. The flame spread of the sample containing a mixture of antimony trioxide and zinc sulfide is considerably less than a sample containing 1.5 parts of antimony trioxide without zinc sulfide.

EXAMPLE 2

The evaluation for flammability described in the preceding Example 1 was repeated using a mixture containing antimony oxide and lithopone (a commercially available material containing 28% zinc sulfide and 72% barium sulfate). The polymer formulation employed to evaluate this flame retarding agent contained 100 parts by weight of a vinyl chloride homopolymer, 50 parts of dioctyl phthalate, 20 parts of calcium carbonate, 0.5 part stearic acid, 0.2 parts mineral oil, 1 part titanium dioxide, 2.5 parts of the barium-cadmium stabilizer described in Example 1. One sample (A) contained 3 parts of antimony trioxide and the second sample (B) contained 1.5 parts antimony trioxide and 1.5 parts lithopone.

TABLE I

| | | | | | | | | | Control |
|---|---|---|---|---|---|---|---|---|---|
| Zinc sulfide (parts) | 0.3 | 0 | 0.3 | 0 | 0 | 1.0 | 0.3 | 0.3 | 0 |
| Antimony trioxide (parts) | 0 | 1.5 | 1.5 | 0 | 1.5 | 1.5 | 1.5 | 1.5 | 0 |
| Magnesium hydroxide (parts) | 1.2 | 0 | 1.2 | 0 | 0 | 0.5 | 0 | 0 | 0 |
| Lithopone* (parts) | 0 | 0 | 0 | 1.5 | 1.5 | 0 | 0 | 0 | 0 |
| Calcium hydroxide (parts) | 0 | 0 | 0 | 0 | 0 | 0 | 1.2 | 0 | 0 |
| Aluminum hydroxide (hydrated) | 0 | 0 | 0 | 0 | 0 | 0 | 0 | 1.2 | 0 |

TABLE I-continued

|  |  |  |  |  |  |  |  |  | Control |
|---|---|---|---|---|---|---|---|---|---|
| (parts) |  |  |  |  |  |  |  |  |  |
| $I_s$ | 289.2 | 150.19 | 84.3 | 250.5 | 57.0 | 69.9 | 100.3 | 110 | 680 |

*A mixture containing 28% zinc sulfide and 72% barium sulfate.

The polymer composition was extruded to form a tube with an outside diameter of ¾ inch (1.9 cm.) and a wall thickness of 0.055 inch (0.14 cm.).

When evaluated using ASTM test E162-67, Sample B, which contained both antimony trioxide and lithopone, was considerably less flammable ($I_s = 50.2$) than Sample A, which contained only antimony trioxide and exhibited an $I_s$ value of 64.1.

EXAMPLE 3

The 0.025 inch (0.063 cm.) thick film samples described in the preceding Example 1 were evaluated for smoke generation using a smoke density chamber available from the American Instrument Company, Inc. as catalog no. 4-5800. The density ($D_m$) of the smoke generated by a heated or burning sample is measured photometrically and can be calculated using the equation $$D_m = 132 [\log_{10}(100/T)]$$

wherein $T$ is the percent transmittance measured at a time when the density of the smoke generated by the burning or smoldering sample reaches a maximum. The constant 132 is determined by the volume of the combustion chamber and the dimensions of the sample, which is a square measuring 3 inches (7.6 cm.) along each side.

For nonflaming (smoldering) exposures, the burner is moved away from the specimen exposure area. During flaming exposures, the burner is positioned across the lower edge of the specimen. The premixed (air-methane) burner gas is adjusted to produce controlled flows of 0.80 ft.³/hr. (375 cm.³/min.) of air and 0.26 ft.³/hr. (125 cm.³/min.) of methane, for a total flow of 1.06 ft.³/hr. (500 cm.³/min.).

Before positioning the test specimen, the chamber air starting temperature is measured using a thermocouple. This measurement is made with the chamber door and all dampers closed and sealed. A record is made of the temperature reached at 1.0±0.1 minute after the chamber is sealed. This temperature must be within the range of 100°±10° F. (38°±5° C.). The chamber is flushed with air with the door and exhaust and inlet dampers open. The exhaust and inlet dampers are then closed. The loaded specimen holder is placed on the bar supports in front of the furnace (burner for flaming exposures) by displacing the "blank" holder. The chamber door is closed and the timer is started.

A record is made of the light transmittance and corresponding time, either as a continuous plot with a recorder or in intervals of not more than 15 seconds, with a multi-range meter readout.

The chamber pressure rise is monitored to determine any leakage between tests. This pressure must be in the range of 4±2 inches (10±5 cm.) of water.

For flaming tests the inlet damper must be closed at least 5 seconds after the start of the test and pressure in excess of 1 inch (2.5 cm.) is vented so that the gas and air flow rate to the flame will be uniform during the test.

Periodic light transmittance readings are taken until minimum light transmittance is reached or until the exposure time of the sample totals 20 minutes, whichever occurs first. If desired, the test may be conducted for periods in excess of 20 minutes, when a minimum transmittance level has not been attained during the 20-minute exposure.

The smoke density values obtained using the foregoing procedure must be corrected to compensate for the accumulation of soot and other combustion products on the windows of the photometer. This is accomplished using the formula $$\text{corrected } D_m = D_m - D_c = D_{m-c}$$

wherein $D_c$ represents the specific optical density equivalent for the deposits on the windows of the photometer.

The data from the smoke density evaluation on burning and non-burning (i.e. smoldering) samples are summarized in the following table. The mixture referred to in the table contained 1.5 part antimony trioxide ($sb_2O_3$), 0.3 part zinc sulfide and 1.2 parts magnesium hydroxide. The term $T_{90}$ refers to the time interval between initial exposure of the sample to a flame or radiant heat and an increase in the optical density value to 90% of the maximum.

|  | Flaming | | |
|---|---|---|---|
| Formulation | 1.5 $Sb_2O_3$ | 3.0 $Sb_2O_3$ | 3.0 Mixture |
| Dm | 269 | 309 | 245 |
| Dc | 6 | 6 | 5 |
| Dm−c | 263 | 303 | 240 |
| $T_{90}$ | 1.36 min. | 1.42 min. | 1.47 min. |

|  | Non-Flaming | | |
|---|---|---|---|
| Dm | 316 | 292 | 236 |
| Dc | 30 | 30 | 26 |
| Dm−c | 286 | 262 | 210 |
| $T_{90}$ | 8.65 min. | 9.40 min. | 9.53 min. |

The foregoing data demonstrate that the addition of zinc sulfide decreases the amount of smoke generated by burning samples containing antimony trioxide as a flame retarding agent.

EXAMPLE 4

The effect on the heat stability of polyvinyl chloride of zinc sulfide, zinc sulfate and zinc oxide was determined using the polymer formulation disclosed in Example 1.

|  | Parts Added | | | |
|---|---|---|---|---|
|  | 1 | 2 | 3 | 4 |
| PVC Formulation (Ex. 1) | 150 | 150 | 150 | 150 |
| $Sb_2O_3$ | 1.5 | 1.5 | 1.5 | 1.5 |
| $Mg(OH)_2$ | — | 1.2 | 1.2 | 1.2 |
| ZnS | — | .3 | — | — |
| ZnO | — | — | .3 | — |
| $ZnSO_4$ | — | — | — | .3 |

The five compositions were blended and formed into 0.020 inch (0.051 cm.)-thick films. The films were cut into squares measuring 1 inch (2.54 cm.) along each side. The squares were placed in an oven maintained at 400° F. (204° C.). Samples were withdrawn every 5 minutes and evaluated for color. All samples were white prior to being heated in the oven. The results of the heat stability tests are summarized in the following table.

| Sample No. | Heating Period (Minutes) at 400° F. | | | | | | | |
|---|---|---|---|---|---|---|---|---|
| | Initial | 5 | 10 | 15 | 20 | 25 | 30 | 35 | 40 |
| #1(control) | W | W | W | OW | OW | Y | BR | BR | BR |
| #2 | W | W | W | W | W | W | Y | Y | BR |
| #3 | W | W | W | OW | OW | BL | BL | BL | BL |
| #4 | W | W | W | OW | OW | Y | BR | BL | BZL |

W = White
OW = Off-white
Y = Yellow
BR = Brown
BL = Black

Sample number 2, which contained a mixture of magnesium hydroxide and zinc sulfide, exhibited the highest level of heat stability. Zinc sulfate and zinc oxide adversely affected the long-term heat stability of the control (sample no. 1), which did not contain any zinc compounds.

EXAMPLE 5

The flame retardancy imparted to a vinyl chloride polymer formulation by zinc sulfide and antimony trioxide was evaluated using Limiting Oxygen Index (L.O.I.) values. The procedure for obtaining L.O.I. values is described in the November, 1966 issue of Modern Plastics at pages 141–148 and 192. The test samples are placed in a vertically oriented Pyrex glass tube, approximately 3.5 inches in diameter, which has a bed of glass beads located at the bottom thereof and a smaller Pyrex glass tube of approximately 7 mm. in diameter located concentrically with respect to the larger tube. The samples are suspended above the smaller tube. A known mixture of oxygen and nitrogen is introduced at the bottom of the larger tube and flows up through the glass beads. The flow of each gas is controlled and monitored by means of valves and flow meters.

The sample is ignited and the minimum concentration of oxygen required to support combustion is noted. The Limiting Oxygen Index is calculated using this minimum oxygen concentration and the formula $$\frac{[O_2]}{[O_2] + [N_2]} \times 100$$

wherein $[O_2]$ and $[N_2]$ represent the relative amounts of oxygen and nitrogen, respectively, expressed in any convient units such as flow rate in cubic centimeters per minute.

Samples with an oxygen index of 21.0 or less will burn readily in air while oxygen indeces increasingly greater than 21.0 indicate that the sample would burn with greater difficulty, if at all, in air.

The composition of the two formulations evaluated together with the limiting oxygen index values are summarized in the following table.

| | | |
|---|---|---|
| Vinyl chloride homopolymer (parts) | 100 | 100 |
| Dioctyl phthalate (parts) | 50 | 50 |
| Epoxidized soybean oil (parts) | 3 | 3 |
| Stabilizer of Example 1 | 2.5 | 2.5 |
| Stearic acid | 0.5 | 0.5 |
| Zinc sulfide | — | 1.0 |
| Limiting oxygen index | 22.7 | 23.3 |

The data in the preceding table demonstrate that zinc sulfide imparts a useful level of flame retardancy to a plasticized vinyl chloride polymer in the absence of a base such as magnesium hydroxide. As previously disclosed the presence of a base is desirable, since it will react with any acidic materials generated during pyrolysis of the polymer composition.

EXAMPLE 6

The flame retardancy of four polypropylene formulations was measured using Limiting Oxygen Index values as described in Example 5. The composition of each formulation and the L.O.I. values are set forth in the following table.

| Formulation | Control | 1 | 2 | 3 |
|---|---|---|---|---|
| Polypropylene (Profax ® 6524) (parts) | 100 | 60 | 60 | 60 |
| Perchloropentacyclodecane (parts) | — | 30 | 30 | 30 |
| Antimony trioxide (parts) | — | 10 | 5 | 5 |
| Zinc sulfide (parts) | — | — | 1 | — |
| Magnesium hydroxide (parts) | — | — | 4 | — |
| Lithopone (ZnS-BaSO₄ mixture) (parts) | — | — | — | 5 |
| L.O.I. | 17.6 | 28.3 | 27.9 | 27.9 |

These data demonstrate the improvement in flame retardancy imparted by zinc sulfide to a non-halogen-containing polymer.

EXAMPLE 7

The evaluation procedure described in Example 5 (L.O.I. values) was repeated using a commercially available terpolymer of acrylonitrile, butadiene and styrene. The composition and L.O.I. value for each of the formulations tested are set forth in the following table. Flame retardant A contained 50% by weight of antimony trioxide, 10% zinc sulfide and 40% magnesium hydroxide. Flame retardant B contained 50% antimony trioxide and 50% of lithopone (28% zinc sulfide and 72% barium sulfate).

| Formulation | Control | 1 | 2 | 3 |
|---|---|---|---|---|
| ABS Terpolymer | 80 | 80 | 80 | 80 |
| Halogen source* | — | 15 | 15 | 15 |
| Antimony trioxide | — | 5 | — | — |
| Flame retardant A | — | — | 5 | — |
| Flame retardant B | — | — | — | 5 |
| L.O.I. value | 18.3 | 31.4 | 28.0 | 30.6 |

*Halogen source - A condensation product of hexachlorocyclopentadiene and pentabromostyrene.

EXAMPLE 8

The evaluation procedure described in Example 5 was employed using polystyrene with decabromobiphenyl oxide as the halogen source. The composition and limiting oxygen index (L.O.I.) values for the three formulations tested are set forth in the following table.

| Formulation | Control | 1 | 2 |
|---|---|---|---|
| Polystyrene | 100 | 85 | 85 |
| Halogen source | — | 10 | 10 |
| Zinc sulfide | — | — | 5 |
| L.O.I. value | 18.0 | 21.4 | 22.6 |

These data and those disclosed in the preceding Example 7 clearly demonstrate the improved flame retardancy that can be achieved for non-halogenated polymers using zinc sulfide in combination with a halogen source.

What is claimed is:

1. A flame retardant halogen-containing polymer composition comprising (1) a polymer selected from the group consisting of (a) polymers wherein at least a portion of the repeating units are derived from a halogen-containing monomer selected from the group consisting of ethylenically unsaturated compounds, (b) halogen-containing polyesters derived from the reaction of at least one dicarboxylic acid containing from 4 to 20 carbon atoms with at least one diol containing from 2 to 20 carbon atoms, (c) non-halogen-containing polymers wherein the repeating units are derived from at least one ethylenically unsaturated compound and (d) non-halogen-containing condensation polymers selected from the group consisting of polyesters, polyamides, polycarbonates, epoxide polymers and non-cellular polyurethanes, wherein any non-halogen-containing polymer is present in combination with an organic halogen-containing compound, the halogen content of any polymer composition is from 7 to 40% chlorine or 3 to 20% bromine, based on the weight of said polymer and said halogen is chlorine or bromine, (2) from 0.3 to 50%, based on the weight of said polymer, of zinc sulfide, and (3) a basic compound selected from the group consisting of magnesium hydroxide, calcium hydroxide, barium sulfate and hydrated alumina.

2. A flame retardant composition as set forth in claim 1 wherein the polymer is derived at least in part from a halogen-containing ethylenically unsaturated compound.

3. A flame retardant composition as set forth in claim 2 wherein said ethylenically unsaturated compound is a vinyl halide.

4. A flame retardant composition according to claim 1 wherein said composition contains from 1 to 10%, based on the weight of polymer, of antimony trioxide.

5. A flame retardant composition according to claim 1 wherein the polymer does not contain halogen and is selected from the group consisting of polyolefins, polystyrene and copolymers of acrylonitrile with at least one ethylenically unsaturated hydrocarbon.

6. A flame retardant composition according to claim 5 wherein the polyolefin is polypropylene.

7. A flame retardant composition according to claim 5 wherein the acrylonitrile copolymer is a terpolymer of acrylonitrile, butadiene and styrene.

8. A flame retardant composition according to claim 1 wherein said composition is coated on a flammable substrate.

9. A method for imparting flame retardancy to halogen-containing polymer compositions wherein the polymer is selected from the group consisting of (a) polymers wherein at least a portion of the repeating units are derived from a halogen-containing monomer selected from the group consisting of ethylenically unsaturated compounds, (b) halogen-containing polyesters derived from the reaction of at least one dicarboxylic acid containing from 4 to 20 carbon atoms with at least one diol containing from 2 to 20 carbon atoms, (b) non-halogen-containing polymers wherein the repeating units are derived from at least one ethylenically unsaturated compound and (c) non-halogen-containing condensation polymers selected from the group consisting of polyesters, polyamides, polycarbonates, epoxide polymers and non-cellular polyurethanes, wherein any non-halogen-containing polymer is present in the polymer composition in combination with a quantity of an organic halogen-containing compound, the halogen content of any polymer composition is from 7 to 40% chlorine or 3 to 20% bromine, based on the weight of polymer, and the halogen is chlorine or bromine, and wherein said method consists essentially of combining the halogen-containing polymer composition with (1) from 0.3 to 50%, based on the weight of said halogen-containing or non-halogen-containing polymer, of zinc sulfide, and (2) an amount of a basic material sufficient to react with acidic compounds generated during the pyrolysis of said compositions, said basic material being selected from the group consisting of magnesium hydroxide, calcium hydroxide, barium sulfate and hydrated alumina.

10. A method according to claim 9 wherein said polymer is derived at least in part from a halogen-containing ethylenically unsaturated compound.

11. A method according to claim 10 wherein said ethylenically unsaturated compound is a vinyl halide.

12. A method according to claim 11 wherein said vinyl halide is vinyl chloride.

13. A method according to claim 9 wherein said composition contains from 1 to 10%, based on the weight of polymer, of antimony trioxide.

14. A method according to claim 9 wherein the polymer does not contain halogen and is selected from the group consisting of polyolefins, polystyrene and copolymers of acrylonitrile with at least one ethylenically unsaturated hydrocarbon.

15. A method according to claim 14 wherein the polyolefin is polypropylene.

16. A method according to claim 14 wherein the acrylonitrile copolymer is a terpolymer of acrylonitrile, butadiene and styrene.

17. A flame retarding agent for synthetic organic polymers comprising zinc sulfide, a basic compound selected from the group consisting of magnesium hydroxide, calcium hydroxide, barium sulfate and hydrated alumina, and an amount of an organic halogen source equivalent to from 2 to 10 moles of halogen per mole of zinc sulfide, wherein said halogen source is selected from the group consisting of halogen-containing hydrocarbons and halogen-containing esters of phosphoric and phosphorus acids and wherein said halogen is chlorine or bromine.

18. A flame retarding agent according to claim 17 wherein the organic halogen source is a halogen-containing bicyclic hydrocarbon.

19. A flame retarding agent according to claim 17 wherein said basic compound is barium sulfate and is present in combination with zinc sulfide as lithopone.

20. A flame retarding agent according to claim 17 wherein antimony trioxide is present in an amount from 60 to 83%, based on the combined weight of antimony trioxide and zinc sulfide.

* * * * *